Nov. 27, 1962 A. F. GARTON, JR 3,066,050

FABRICATION OF SEMICONDUCTOR DEVICES

Filed March 23, 1960

INVENTOR.
ALBERT F. GARTON, JR.
BY
F. D. Prager
ATTORNEY

United States Patent Office 3,066,050

Patented Nov. 27, 1962

3,066,050

FABRICATION OF SEMICONDUCTOR DEVICES

Albert F. Garton, Jr., Malvern, Pa., assignor, by mesne assignments, to Philco Corporation, Philadelphia, Pa., a corporation of Delaware Filed Mar. 23, 1960, Ser. No. 17,180
5 Claims. (Cl. 134—2)

Figure 1:
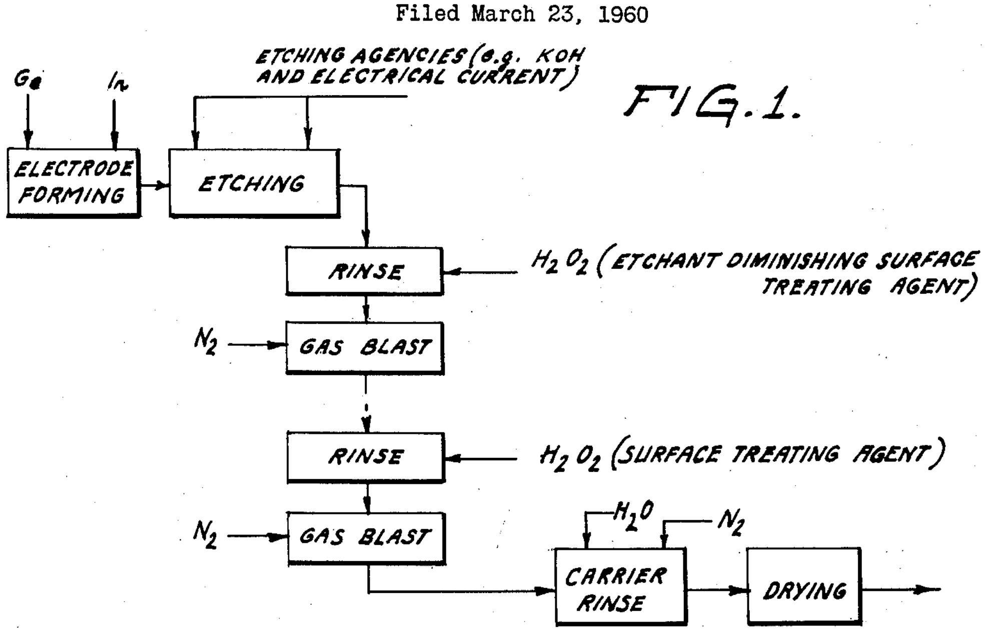

This invention pertains to the fabrication of certain semiconductor devices, particularly germanium diodes and transistors. It provides a new method of treating semiconductor surfaces which is advantageously used in the finishing stages of such fabrication.

In the interest of proper electronic performance of semiconductor devices, many attempts have heretofore been made to prevent contamination of semiconductor surfaces. It is usual to apply a so-called clean-up etch and thereby to remove damaged surface material and dirt, which are certain to be present at least in minute amounts as a result of other fabricating operations. The clean-up etch also oxidizes and thereby protects and stabilizes the remaining, clean material of the etched germanium surfaces.

It has been known that, in order to avoid further problems, the oxidized germanium surfaces must be rinsed, so as to remove residual etchant and the like. Certain facts have however been noted, indicating that during or after the final rinse, and usually just prior to the ultimate drying and encapsulation of the device, there is incurred a danger of again subjecting the oxidized germanium surfaces to physical disturbance. More specifically, I have discovered that a certain water washing or rinsing treatment, hitherto considered as the most advanced technique known to this art, has had certain side effects, more fully described hereinafter, which has caused deleterious disturbance of the semiconductor surfaces.

It is accordingly a primary object of my invention to avoid such further disturbance and to provide a novel, surface-finishing rinse, maintaining or even improving the desirable features of surface condition established by the clean-up-etch, while safely removing undesired residual products. Another important object is to provide rinse operations which can be performed and controlled with precision and yet with simplicity and economy.

I have found it possible to achieve these objects, and others which will appear from the further discussion hereinafter, by means of a new and highly selective rinsing method. I briefly describe this method as comprising application of a solution of hydrogen peroxide ($H_2O_2$) to a germanium (Ge) surface which at least at the start of such application is still covered with a film of clean-up etching electrolyte, such as potassium hydroxide (KOH). More specifically, this new method can be outlined as follows.

Presupposed is a certain type of semiconductor unit whereto a certain type of clean-up etching procedure has been applied. The invention pertains particularly to the treatment of a unit comprising a germanium blank with indium type electrodes and whereon potassium hydroxide solution has been used as an electrolyte, for clean-up etch provided by an electrical etching current. The clean-up etch has removed damaged and contaminated surface material from the germanium surfaces directly surrounding the electrodes.

The clean-up etch itself, as already indicated, gives rise to difficulties. In fact the very last molecules of clean-up etchant, and also of certain products thereof, must be satisfactorily disposed of, prior to encapsulation of the device, in order to safeguard proper performance of the device and continued maintenance of such performance. It is an object of the invention to improve the disposal of clean-up etchant and of products thereof, in the way to be described presently.

It has been usual to dispose of residual clean-up etchant and waste products by simply removing it, for which purpose it was preferred to rinse the etched area of the semiconductor device with de-ionized water of high purity and thereafter to evaporate such water. I have however found that very definite difficulties were, in turn, caused by the rinsing of the semiconductor in de-ionized water.

It appears that water not only provides a solvent and/or entraining agent for the residual clean-up etchant and waste products to be removed, but also disturbs the clean-up etched semiconductor surface, which should be kept intact. It is possible to some extent to repair such damage by applications of surface oxidizing agents, pursuant to a water rinse, but I have found that much better results are obtained by a certain use of a suitable oxidizing agent in lieu of any application of pure rinsing water. I have further found that one and only one method of using or applying an oxidizing agent seems to provide these improved results, said method involving application of a moving body of aqueous solution of hydrogen peroxide ($H_2O_2$) to clean-up etched germanium-indium surfaces which still have alkaline etchant, such as potassium hydroxide (KOH) adherent thereon.

For reasons which are not presently understood, this method seems to be peculiarly and perhaps exclusively effective when applied to germanium devices having electrodes of indium or of alloys thereof.

The operations whereby the new method is performed will now be considered, in connection with the drawing appended hereto.

Figure 3:
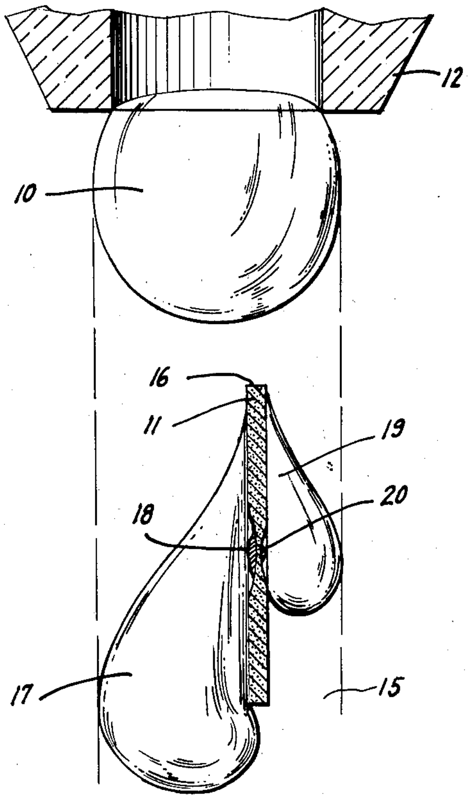
Figure 2:
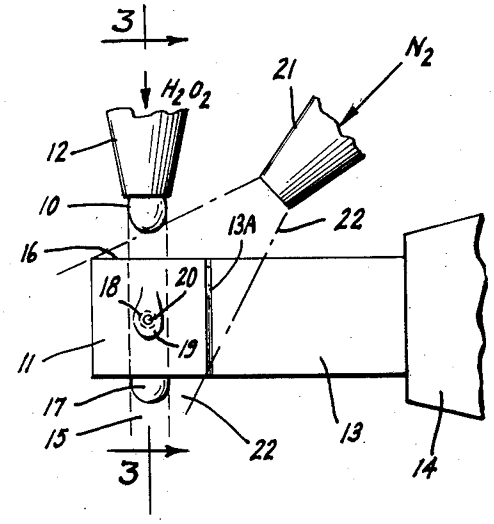

In this drawing, FIGURE 1 is a block diagram of a fabricating process, including a preferred manner of performing the method according to this invention. FIGURE 2 is a greatly enlarged, schematic elevational view of equipment, elements, and materials used in the performance of the method. FIGURE 3 is an additionally enlarged sectional view, taken generally along line 3—3 in FIGURE 2.

Referring to FIGURE 1, it will readily be understood that the initial fabricating operations, collectively designated by the block labelled "Electrode Forming," are followed in this instance by a clean-up etching operation wherein surface portions of the germanium (Ge) and of the indium or alloy thereof (In) are etched by electrolytic dissociation of potassium hydroxide (KOH, also known as caustic potash), as indicated by the block labelled "Etching" and the connected legend "Etching Agencies (e.g. KOH and Electrical Current)." The potassium hydroxide or equivalent alkaline electrolyte or etchant is desirably used in fairly high concentration, as is known to the art, and it is of course understood that proper control must be applied with respect to direction and density of the electrolytic current, by suitable equipment (not shown).

According to the invention this clean-up etch is followed, without intermediate removal of remaining and adherent alkaline etchant, by the application of moving hydrogen peroxide liquid ($H_2O_2$), particularly in drop form, which in turn is followed by a blast of nitrogen gas ($N_2$). Preferably such applications of liquid drops and gas blast are repeated in a cycle, as indicated by the vertical series of blocks which appears in the center of the figure.

I have obtained uniquely favorable results by such application of hydrogen peroxide to the germanium and indium surfaces with alkaline etchant thereon particularly when the peroxide has been applied as a moving mass. I am not, as already mentioned, at this time aware of any other method, producing equivalent results.

The preferred cycle of peroxide applications begins promptly upon the end of the clean-up etch, without intervening steps and definitely without intervening application of water. At this time a film of alkaline clean-up etchant is still present on the germanium. The cycle includes a series of steps, each of which is designated in the drawing as providing for the application of a "Rinse," and each of which provides the application of a few (preferably five) drops of the peroxide. This is followed by a "gas blast," preferably using nitrogen ($N_2$), as shown, to remove excess rinse liquid and contaminants carried thereby.

The block diagram shows two such applications of rinse and gas blast. It is however possible and frequently desirable to repeat the sequential applications of peroxide and nitrogen, and such is schematically indicated, by the broken line which appears between the first and last treatment steps, or rinse and gas blast applications in FIGURE 1.

A simple arrangement for the application of such rinse and gas blast operations is shown at a substantially enlarged scale in FIGURE 2 and even larger in FIGURE 3. A peroxide liquid drop 10 has been formed, with the aid of suitable, slow-rate liquid feeding equipment (not shown). It should of course be kept in mind that the drops, shown with great enlargement in the drawing, are very small in the actual practice of the invention.

The peroxide drop is applied to a thin germanium blank or wafer 11, for which purpose the drop forming, dispensing and feeding nozzle 12, made for instance of aluminum, is shown as being held just above the edge of said blank, the blank being supported, in vertical orientation, by the usual base tab 13, held at the end of a carrier 14.

The parts are so dimensioned and held that successive peroxide drops, usually having 50 to 75 mil diameter, fall from the drop former 12 through a path 15, which path is disposed so that each falling drop is intercepted and split by the top edge 16 of the thin blank. Said edge 16 is desirably located so, with respect to said path 15, that a major portion 17 of each drop rolls over a relatively large, indium alloy collector electrode 18 on one side of the blank, whereas a relatively minor liquid portion 19 rolls over the smaller emitter 20, made of similar material and disposed on the other side.

The drops are shown in FIGURE 2 as having a diameter smaller than the side length of the transistor blank; they may however be larger than said length. In either case, the use of falling or rapidly moving drops of peroxide solution is highly advantageous because it facilitates selective contacting, that is, contacting the semiconductor 11 and the electrodes 18, 20 with the peroxide liquid in such a way that none of said liquid can carry contaminants from the base tab 13 and the solder or weld joint 13A thereof (FIGURE 2) back to the germanium. The indicated splitting of the drops accelerates the process. It also facilitates the treatment, since it would be difficult to form and apply drops of the very minute size as employed at 19.

Incident to the application of the first few drops of hydrogen peroxide, the germanium body 11 and the indium alloy electrodes 18, 20 have small but positive amounts of potassium hydroxide (KOH) still adhering thereto in form of a thin film, as already indicated. Such hydroxide, per se, has no effect as an etchant of either germanium or indium. It serves as an etching agent or agency, however, when an electrical current of proper polarity is sent through a liquid containing this hydroxide as an electrolyte (as is suggested by the second block in FIGURE 1); and, importantly, certain etching characteristics are displayed also when the potassium hydroxide is mixed with a potentially oxygen releasing agent. This latter condition obtains incident to the application of the first drop or drops of hydrogen peroxide ($H_2O_2$). The peroxide, alone, as well as the hydroxide, alone, would not apply any significant etching effect to the germanium. However, the potassium of the residual etchant catalyzes the liberation of oxygen, from the peroxide. This in turn leads to a positive and relatively rapid formation of germanium oxide and/or dioxide, without deleterious side effects.

Such oxide formation proceeds so long and probably in such measure as germanium, potassium, peroxide, and solvent water are present in certain forms and proportions, the exact limits of which are presently unknown. It is clear, however, from applications of the new process, that the proportioning of materials, required for a mild but positive oxidizing effect, is established soon after the formation of the first peroxide drop, and that the subsequent applications of further peroxide drops lead to a gradual stepwise diminishing of the effects of the catalyzing, oxygen liberating, and oxygen combining reactions.

In order to suggest this effect, it has been indicated in FIGURE 1 that at least the early drops of peroxide serve as an "etchant diminishing" agent.

No such effect is produced when the transistor blank is contacted with pure water. In such case the peculiar combination or proportioning of materials, available to produce the diminishing etch and surface oxidation, does not seem to be brought about at any time. The water, however, would rinse off former etching products actively and even violently. The new treatment, by contrast, seems to build and protect an effective oxidized germanium surface while rinsing off and entraining the waste products by means of the liquid solvent containing the dissolved peroxide, this solvent consisting of pure water which is advantageously prepared by de-ionizing water and which according to the invention contains the peroxide as a solute.

This entrainment of waste products is aided by the intermittent gas blasts. When the first few peroxide drops have been applied and when the bulk of their liquid, together with residual and waste products therein, has been allowed to roll off, small amounts of the hydroxide, peroxide, and waste products are still in contact with the germanium and indium. According to FIGURE 2, these are removed, in great part, by a first blast of nitrogen, applied through a suitably positioned and oriented gas discharge nozzle 21, under the control of suitable equipment (not shown). The blast 22 of such gas is applied most effectively for a period of approximately ten seconds, after about five seconds, required for application of the five peroxide drops.

Application of liquid drops and of the gas may be had either at a single location, as suggested by FIGURE 2, or by passing carrier 14, with transistor 11 thereon, through a suitable sequence of treatment stations (not shown).

Because of the complete avoidance of any rinsing or washing of clean-up etched semiconductor surfaces in pure water, residual liquid particles of clean-up etchant and/or products thereof are likely to adhere, as a film, to carrier 14 and tab 13. These, or constituents thereof, would tend to evaporate and to recontaminate the transistor, and they must therefore be removed, if the carrier, tab and transistor remain assembled for any appreciable length of time. For this reason FIGURE 1 indicates the application of a "carrier rinse," wherein water ($H_2O$) is applied in suitable ways, not shown, in order to clean carrier 14 and in some techniques also to clean the tab surfaces, the use of warm or hot water being preferred and care being taken to avoid contact of the water with the blank, and consequent recontamination of the clean-up etched, peroxide treated germanium.

In some instances it is preferable, in fact, to apply a modified rinsing cycle (not shown), wherein a rinse, applied to the carrier and tab only and employing pure water, is provided directly after each peroxide rinse and gas blast application, so that one stage of the cycle then proceeds approximately as follows: 5 seconds for 5 peroxide drops—10 seconds nitrogen blast—5 seconds carrier rinse; such stages being repeated, for instance six times, to provide a complete rinse cycle which accordingly lasts about 2 minutes. Such use of repeated carrier rinses is preferred in the event that carrier 14 is not horizontally oriented, as in FIGURE 2, but disposed in a modified position (not shown), below the transistor, in which case recontamination of germanium by base tab constituents or the like is particularly safely avoided. In the interest of simplicity, however, the use of a single carrier rinse has been indicated in FIGURE 1.

This final carrier rinse is of course followed by removal of the bulk of adherent water from the carrier, for instance by means of a further gas blast, indicated by the final arrow marked $N_2$. In any event the transistor, held by the carrier, is ultimately dried, as indicated by the final block of the diagram, for which purpose the base tab 13 is advantageously removed from carrier 14 and secured to a stem assembly (not shown), forming part of the ultimate semiconductor unit. This stem assembly, with the transistor thereon, is subjected to vacuum baking. Promptly after such baking, the transistor is hermetically enclosed, for instance in a suitable metal capsule and by means of proper cold-forming equipment (not shown).

By virtue of the new rinsing method, and assuming of course the application of proper precautions throughout the fabricating process, the completed device is found to possess highly advantageous characteristics.

The improvement pertains in the first place to the "premium yield" of the fabricating process. For present purposes such yield is defined as the percentage of transistors, in groups of at least 25 or 50, which pass the following tests:

Reverse collector to base current ($I_{CBO}$), when tested at −10 volts, must be equal to or less than 10 microamperes.

Reverse emitter to base current ($I_{EBO}$): same.

Incremental beta at 3 volts and ½ milliampere must be equal to or greater than 42.

Punch-through voltage ($V_{PT}$) must be equal to or greater than 6½ volts.

The improvement also pertains to the average collector breakdown voltage ($\overline{X}BV_{CBO}$) at 1 milliampere, and to the average forward current gain ($\overline{X}h_{fe}$) at 3 volts and ½ milliampere, it being desired that said breakdown voltage, as well as said gain, be as high as possible. Finally, it is of course important that the service life of the transistors, with maintenance of performance as indicated, should be as long as possible. In each of these, as well as other respects, germanium transistors with indium type electrodes, rinsed according to the new method, have been found substantially superior to those which have been formed by means of the most advanced, prior fabricating techniques.

A specific example of the performance and results of the new method is as follows.

A residual film of the solution known as 5-N KOH (a solution of 5 gram-molecules of caustic potassium in 1 gram-molecule of a liquid solvent), adherent to transistor and electrode surfaces, was contacted with drops of 30% $H_2O_2$. The transistors were made of germanium, with indium alloy collectors and emitters, and were of the type known as Micro Alloy Transistors. They were in form of rectangular blanks of 72 x 115 mils side length and 4 mils thick at the edge. The peroxide drops were formed at the rate of 1 per second, with ultimate diameters of about 70 mils, and about two-thirds of each drop was applied to the collector side and one-third to the emitter side of the transistor. A total of ten $H_2O_2$ drops was applied to a first group of test transistors and a total of about thirty drops to another group of test transistors. Upon the application of a few drops, usually 5 drops, a blast of $N_2$ was for about 10 seconds directed against one edge of the transistor and over the side surfaces of the transistor, including the collector and the emitter. Carrier rinse was also applied. The treatment was promptly followed by vacuum baking and encapsulation in cold-formed metal shells.

The results, as to both groups of test transistors, were determined by standard procedures for the initial testing of premium yield, average collector breakdown voltage, average forward current gain, and service life. The results of the initial tests were substantially as follows:

| Premium Yield | $\overline{X}$ BVCBO | $\overline{X}$ $h_{fe}$ |
|---|---|---|
| | *Volts* | |
| 76 to 80% | 53 to 59 | 207 |

Control tests were also conducted, to determine the results of the most advanced, prior technique of final treatment, or rinse, on transistors which otherwise were identical with the above-described test transistors and which were otherwise fabricated in ways identical with those applied to said test transistors. Among other things, the same electrolytic clean-up etch, using KOH, had been applied to the control transistors as to the test transistors.

A first control type of final rinse was applied to a group of control transistors by immersing each, after clean-up etching, in a running stream of de-ionized and highly purified water (having the same purity as the peroxide solvent water used on the test transistors), the conditions of this water rinse, such as water temperature (55° C.) and duration of rinse (15 min.), being those which had previously been found to be most advantageous for this type of rinse. This first control type of final rinse produced only:

| Premium Yield | $\overline{X}$ BVCBO | $\overline{X}$ $h_{fe}$ |
|---|---|---|
| | *Volts* | |
| 36 to 40% | 37 to 47 | 185 |

A second control type of final rinse was also tried, by first immersing each of a further group of newly made transistors in deionized and purified water, exactly as in the first control type of rinse, and promptly thereafter applying 10 drops of $H_2O_2$ solution to these transistors, in exactly the same way as described herein except for the effect of the preceding water rinse. This second control type of final rinse was even less successful than the first control type, in producing premium quality transistors, as defined above. Thus it is clear that a substantial advantage is gained by applying the $H_2O_2$ solution to the transistors in the presence of a remainder of the alkaline clean-up agent, in accordance with the invention.

Accelerated life tests were also conducted. They were run in several ways, including a 1000 hour test at 85° C. and 2000 hour tests at 65° C. and at 50° C. These life tests, collectively, showed that no significant number of failures occurred on either the test transistors or the control transistors. However, these life tests, collectively, also showed that most of the test transistors ended during their accelerated service life to become slightly better, as to their Reverse Currents ($I_{CBO}$ and $I_{EBO}$), whereas most of the control transistors did not during their identical, accelerated service become better in any such respects.

While only one manner of performing the method according to the invention has been described in its entirety, it should be understood that the details thereof are not to be construed as limitative of the invention, except insofar as is consistent with the scope of the following claims.

I claim:

1. In a finishing treatment for a germanium semiconductor device with indium electrodes, etched with aid of an electrolytic etch in a caustic liquid electrolyte agent: exposing germanium and indium surfaces of the device, still covered by such agent, to contact with moving drops of hydrogen peroxide solution dissolved in substantially pure water thus rapidly liberating oxygen from said solution and stepwise diminishing such liberating of oxygen.

2. In a method of finishing germanium semiconductor devices, having indium electrodes, pursuant to clean-up etching by electrolytic treatment in a caustic electrolyte liquid: forming drops of a solution of hydrogen peroxide, in substantially pure water, and running such drops over germanium and indium surfaces of said devices which at least initially have a remainder of said caustic liquid still adherent thereto.

3. In a method of treating a germanium semiconductor wafer, the surfaces of which have indium type electrodes thereon and have been clean-up etched with aid of a solution of potassium hydroxide: holding said surfaces of the wafer, still covered by a film of such agent, in approximately vertical orientation, and dropping a drop of substantially pure aqueous solution of hydrogen peroxide onto an edge of the wafer, between said surfaces, so as to run separate parts of the drop over said film-covered surfaces.

4. In a finishing treatment for surfaces of germanium semiconductor devices with indium type electrodes and metallic base tabs, pursuant to electrolytic clean-up etching of such surfaces in caustic liquid electrolyte, forming drops of substantially pure water with hydrogen peroxide therein and moving said drops over germanium surfaces of said devices, spaced from said base tabs, having said electrodes thereon and having residual clean-up etching electrolyte adherent thereto, and thereby preventing recontamination of said surfaces by base tab material entering the drops.

5. A method of treating germanium-indium devices, pursuant to clean-up etching by electrolytic treatment in a solution of caustic potassium as clean-up etching material and prior to final drying, comprising the steps of exposing germanium-indium surfaces of said devices, with residual clean-up etching material adherent thereto, to hydrogen peroxide, dissolved in substantially pure water and moving over said germanium-indium surfaces and adherent clean-up etching material and substantially not contacting any other surfaces during such moving, then removing such peroxide with the aid of a gas blast, and then repeating such steps.

References Cited in the file of this patent

UNITED STATES PATENTS 2,809,103 Alexander ---------------- Oct. 8, 1957